June 3, 1924.
J. KORANICKI
ANIMAL TRAP
Original Filed April 1, 1922
1,496,421
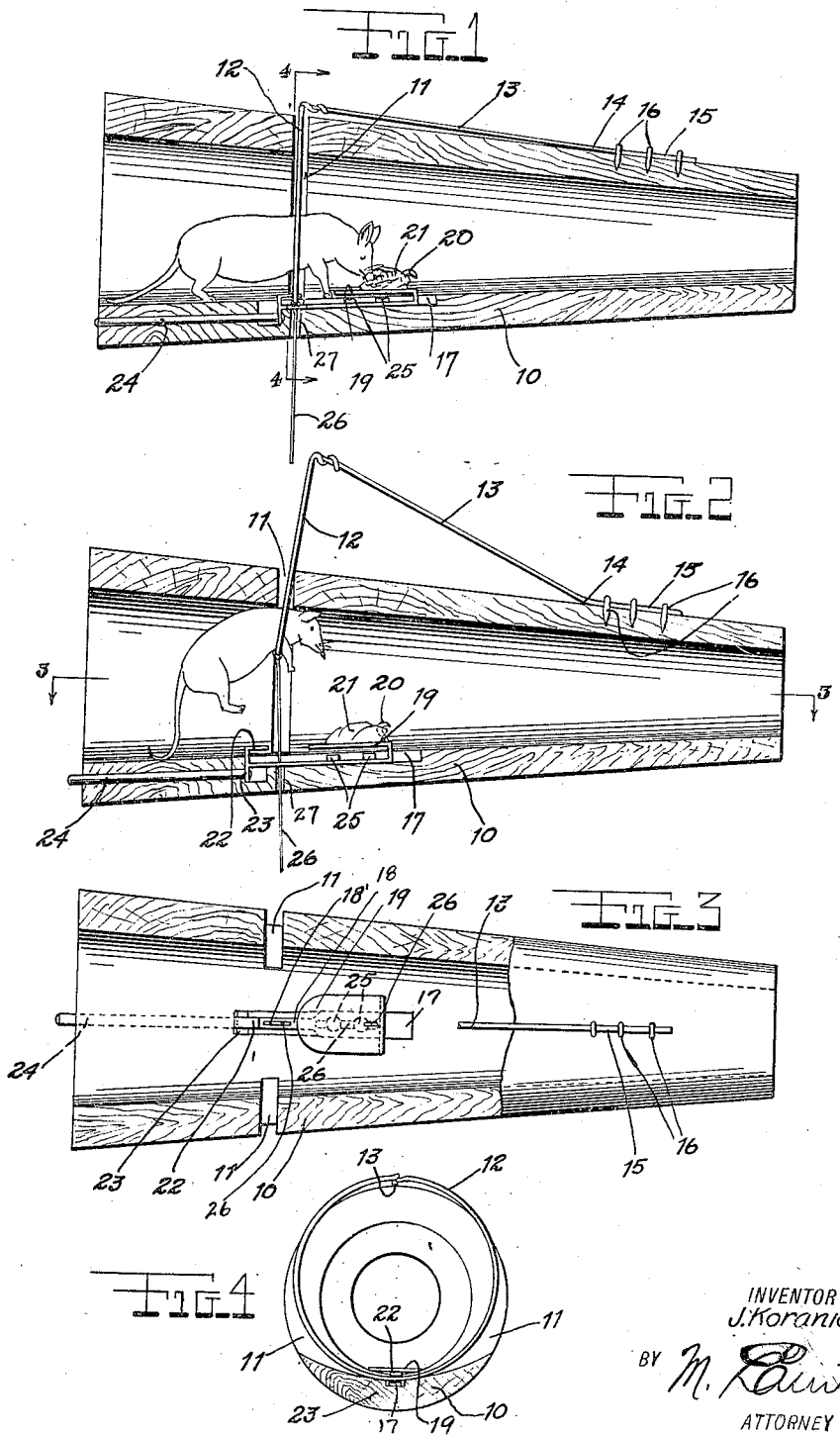
INVENTOR
J. Koranicki
BY M. Lavin
ATTORNEY Patented June 3, 1924.

1,496,421

UNITED STATES PATENT OFFICE.

JOHANN KORANICKI, OF YOUNGSTOWN, OHIO.

ANIMAL TRAP.

Application filed April 1, 1922, Serial No. 548,586. Renewed March 17, 1924.

*To all whom it may concern:*

Be it known that I, JOHANN KORANICKI, a citizen of Poland, residing at Youngstown, in the county of Mahoning and State of Ohio, have invented certain new and useful Improvements in Animal Traps, of which the following is a specification.

One of the objects of this invention is to provide a practical and efficient device for catching rats, mice and other rodents.

Another object is the means provided whereby a trap having a conical annular form may be inserted into a rat hole or placed upon any object or floor in the usual manner.

These and other objects are attained by the novel construction and arrangement of parts hereinafter described and shown in the accompanying drawing, forming a material part of this disclosure, and in which:—

Figure 1 is a sectional elevational view showing the trap in set position.

Figure 2 is a similar view showing the trap in sprung position.

Figure 3 is a partial sectional plan view taken on the line 3—3 of Figure 2.

Figure 4 is a transverse sectional view taken on the line 4—4 of Figure 1.

Referring to the drawing in detail, the numeral 10 designates a hollow annular cone shaped trap body having at a point relatively near the large end of the cone, a deep transverse slot 11 in which the spring actuated choker ring 12 operates.

This choker member consists of a single piece of spring wire having one end formed as a ring 12, secured at the point of termination by twisting the end about the straight wire section 13, near the end of which is a bend 14, forming a spring the short end 15 being secured to the trap body 10 by the staples 16.

A longitudinal slot 17 is formed intermediate interiorly of the trap body in the wall opposite the slot 11.

A metal plate 18, having a widened end offset and back turned acts as a bait plate 19, from which extends a hook 20 securing the bait 21. The opposite end of the metal plate is similarly bent, the end 22 acting as a lock or trigger and a downwardly bent element 23, integral with the plate 18, is connected to a rod 24 passing slidably through a hole drilled lengthwise in the wall of the trap.

The plate 18 is slidably engaged in the slot 17 by rivets 25 secured in the trap wall and passing through slots 26 formed in the plate.

A cord 26 is attached to the choker 12 and passes through a slot 18' in the plate 18 and out of opening 27 drilled through.

In operation, the rod is withdrawn to the limit of its movement, and bait is engaged with the hook 20 of the plate 19. The spring choker 12 is either depressed by forcing down the wire 13 or the cord 26 may be pulled. When the choker is fully depressed, the lock 22 is forced forward, over the choker ring by pushing the rod 24 inward, thus locking down the choker and setting the trap.

By reference to Figure 1 it will be seen that in attaching the bait, the rodent is directly over the choker and, due to the formation of the trap, it will also be seen that if the bait is pulled backward, the lock 22 is disengaged from the choker which in turn is impelled upward by spring 13, carrying with it and securing the rodent in a position shown in Figure 2.

While certain preferred embodiments of this device have been shown and described, it will be understood that changes in the form, arrangements, proportions, sizes and details thereof may be made without conflicting with the scope of the invention, as defined in the appended claims.

Having thus described my invention, what I claim as new and desire to secure by Letters Patent, is:—

1. In a rodent trap, the combination with an open ended hollow conical shell having a transverse slot formed therein, of a bait holding means slidably engaged within the wall of said shell, a rod for manipulating said bait holder, a lock plate integral with the bait holder a choker ring secured in locked or set position in said lock plate, and means for retracting said choker ring when the bait holder is drawn back.

2. In a rodent trap comprising an open ended hollow conical casing adapted to be inserted in a rat hole having a slot transversely formed with the casing, of a spring actuated choker, there being a recess formed in the lower wall of the casing, a slide operable in said recess, the slide comprising at one end a bait holder, a rod for manipulating said slide means with the rod for locking said choker in set position, and means for disengaging said locking means from the choker when the bait holder is drawn back.

In witness whereof I affix my signature.

JOHANN KORANICKI.